(12) United States Patent
Zamora et al.

(10) Patent No.: US 8,322,127 B2
(45) Date of Patent: Dec. 4, 2012

(54) NOZZLE ASSEMBLY WITH FLOW CONDUITS

(75) Inventors: Sean P. Zamora, Coventry, CT (US); Michael J. Murphy, Vernon, CT (US); Gary J. Dillard, Wellington, FL (US); Glenn R. Estes, Winnetka, CA (US)

(73) Assignee: United Technologies Corporation, Hartford, CT (US)

( * ) Notice: Subject to any disclaimer, the term of this patent is extended or adjusted under 35 U.S.C. 154(b) by 1266 days.

(21) Appl. No.: 11/933,537

(22) Filed: Nov. 1, 2007

(65) Prior Publication Data
US 2009/0114740 A1    May 7, 2009

(51) Int. Cl.
*F02K 1/00* (2006.01)
*F02K 1/28* (2006.01)
*B63H 25/46* (2006.01)

(52) U.S. Cl. ........... 60/231; 60/770; 239/265.17

(58) Field of Classification Search ............ 60/228, 60/231, 770, 226.1, 785, 782, 262, 229; 239/265.17
See application file for complete search history.

(56) References Cited

U.S. PATENT DOCUMENTS

| | | | |
|---|---|---|---|
| 4,000,612 A | 1/1977 | Wakeman et al. | |
| 4,000,854 A | 1/1977 | Konarski et al. | |
| 4,709,880 A | 12/1987 | Bradfield et al. | |
| 5,060,472 A | 10/1991 | Schirtzinger | |
| 5,267,436 A | 12/1993 | Wood, Jr. et al. | |
| 5,694,766 A | 12/1997 | Smereczniak et al. | |
| 5,699,966 A | 12/1997 | Beverage | |
| 5,833,140 A | 11/1998 | Loffredo et al. | |
| 6,048,171 A * | 4/2000 | Donnelly et al. | 415/145 |
| 6,195,981 B1 | 3/2001 | Hanley et al. | |
| 6,607,355 B2 | 8/2003 | Cunha et al. | |
| 6,779,336 B2 | 8/2004 | Allore et al. | |
| 7,032,835 B2 | 4/2006 | Murphy et al. | |
| 7,134,271 B2 | 11/2006 | Baughman et al. | |
| 2006/0242942 A1* | 11/2006 | Johnson | 60/228 |
| 2006/0266016 A1* | 11/2006 | Cowan et al. | 60/266 |

* cited by examiner

*Primary Examiner* — Ted Kim
*Assistant Examiner* — Andrew Nguyen
(74) *Attorney, Agent, or Firm* — Carlson, Gaskey & Olds PC

(57) ABSTRACT

A nozzle assembly for a turbine engine has a convergent portion for converging fluid flow from a turbine engine core. A divergent portion for diverging fluid flow from the turbine engine core is in fluid communication with the convergent portion. A conduit is in communication with a bypass fluid flow. The conduit has a thrust vectoring port located near the divergent portion.

13 Claims, 2 Drawing Sheets

US 8,322,127 B2

NOZZLE ASSEMBLY WITH FLOW CONDUITS

BACKGROUND OF THE INVENTION

This invention relates to a nozzle assembly for a turbine engine.

A turbine engine for an aircraft has a nozzle through which thrust gases from the engine pass. The nozzle may have a port, which is used to guide the aircraft. This fluidic thrust vectoring port presents several design challenges. Specifically, for high aspect ratio exhaust nozzles, such as elliptically shaped nozzles, there may be a significant pressure drop between the area where the fluidic thrust vectoring port obtains flow gases for thrust and the area of the nozzle where the fluidic thrust vectoring port discharges into the core gas path of the turbine engine. Such a pressure drop is undesirable.

In addition, as the fluidic thrust vectoring port is opened, the area of the nozzle around the port can be starved of cooling flow. This cooling flow is necessary to keep the nozzle from overheating. Accordingly, it is important to prevent the migration of flow from one section of the divergent section of the nozzle to another.

Moreover, a nozzle using a fluidic thrust vectoring port may have an over-expanded divergent section to obtain favorable pressure ratios for fluidic thrust vectoring. As a consequence of this over-expanded nozzle design, there is a large load placed on the flat sections of the nozzle, making it difficult to control nozzle deflection.

A need therefore exists for a nozzle assembly that addresses each of these foregoing problems.

SUMMARY OF THE INVENTION

The present nozzle assembly for a turbine engine has a convergent portion for converging fluid flow from a turbine engine core. A divergent portion for diverging fluid flow from the turbine engine core is in fluid flow communication with the convergent portion. A conduit, which is in fluid flow communication with a bypass fluid flow, has a thrust vectoring port and is disposed near the divergent portion.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
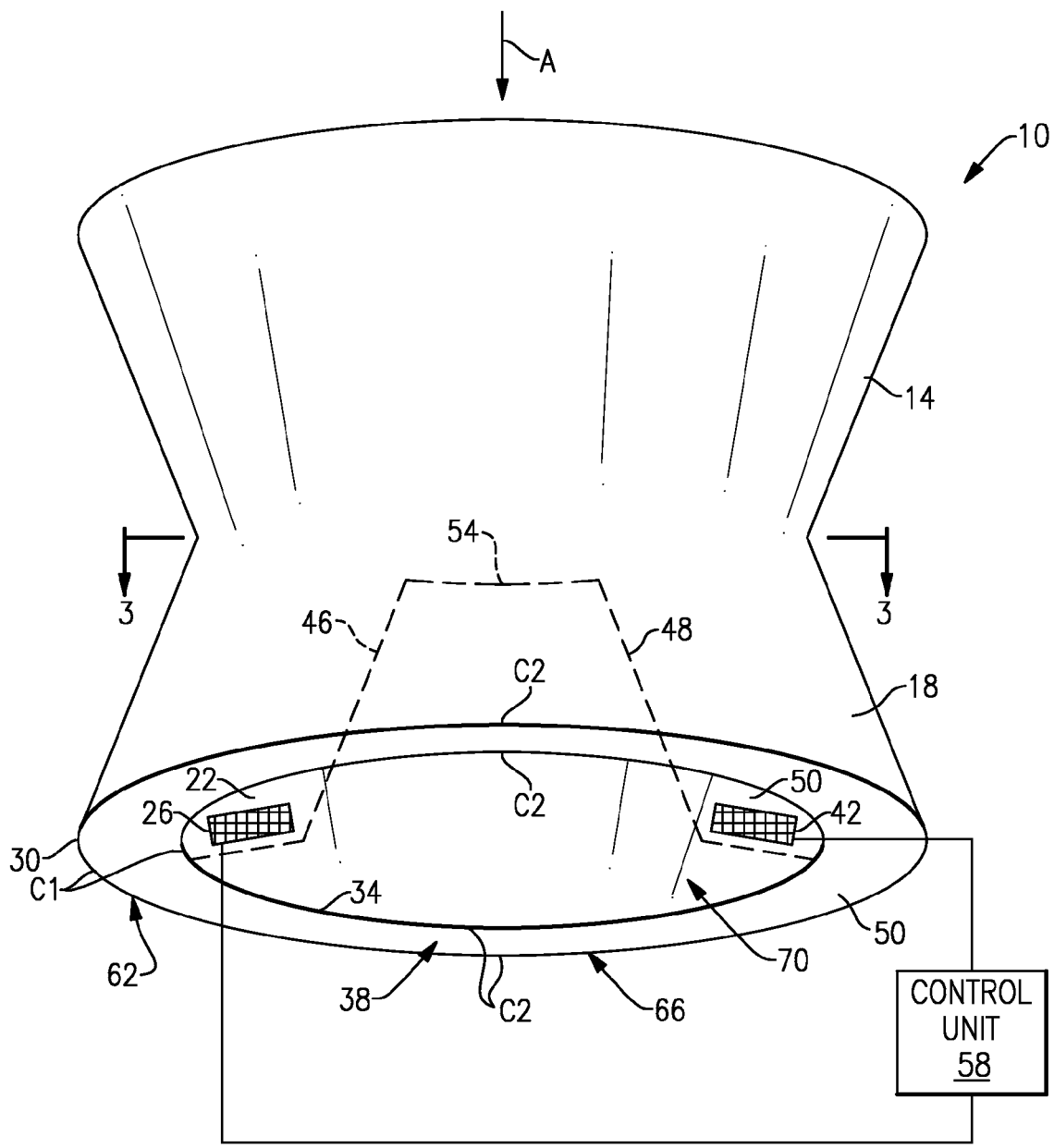
FIG. 1 illustrates a perspective view of the present nozzle design, showing a location of a first thrust vectoring port and a second thrust vectoring port.

FIG. 1 illustrates a perspective view of the present nozzle assembly 10. Nozzle assembly 10 has convergent portion 14 and divergent portion 18. First wall 30 forms an exterior portion of nozzle assembly 10. Second wall 34 is inwardly spaced from first wall 30, forming an interior portion of nozzle assembly 10. A turbine engine (not shown) is in fluid communication with nozzle assembly and passes from its core thrust gases in the direction of arrow A to convergent portion 14, which itself is in fluid communication with divergent portion 18. The core gas flow path from the turbine engine is through core volume 70. Second wall 34 is shaped in convergent portion 14 to converge thrust gases from a turbine engine and shaped in divergent portion 18 to diverge thrust gases as known. Here, divergent portion 18 is shaped like an ellipse and has first curvature C1 at first section 62 and second curvature C2 at section 66. First curvature C1 is greater than second curvature C2 A double liner may be used to insulate second wall 34 from the heat of thrust gases.

Figure 2:
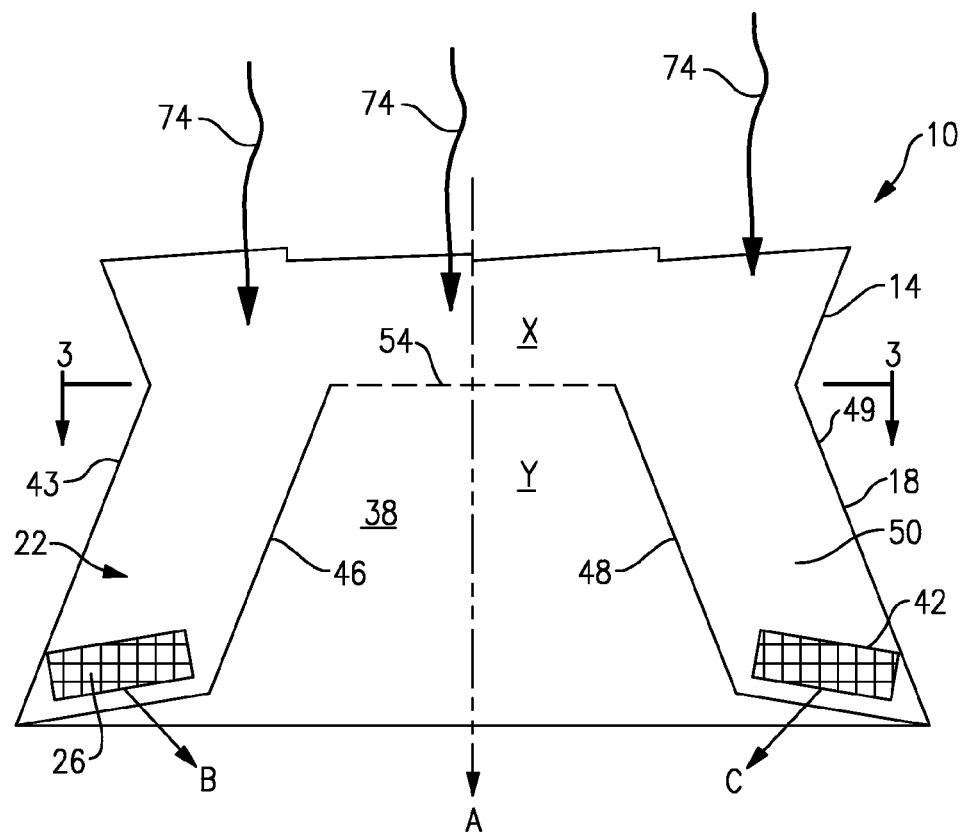
FIG. 2 illustrates an overhead plan view of the present nozzle design of FIG. 1, illustrating conduits associated with the thrust vectoring ports of FIG. 1.
Figure 3:
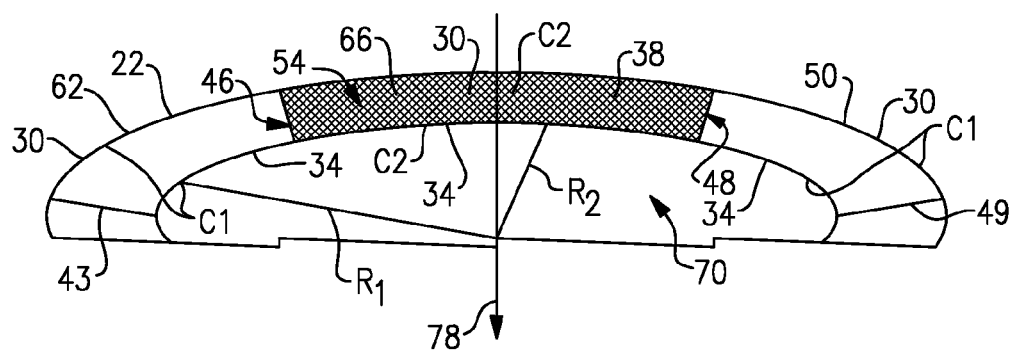
FIG. 3 illustrates a cross-sectional view of the conduits of FIG. 1 and FIG. 2, highlighting a device for reducing pressure loss across one of the conduits of FIG. 2.

With reference to FIG. 2, there are shown three conduits formed between first wall 30 and second wall 34: first conduit 22, second conduit 38 and third conduit 50. First conduit 22, second conduit 38 and third conduit 50 are disposed in divergent portion 18 of nozzle assembly 10. As shown in FIG. 3, first conduit 22, second conduit 38 and third conduit 50 are disposed circumferentially around core volume 70. First conduit 22, second conduit 38 and third conduit 50 are in fluid flow communication with bypass flow 74, such as a flow provided by a bypass fan (not shown) of the turbine engine. At the end of first flow path of first conduit 22 and third conduit 50 are fluid thrust vectoring ports, first thrust vectoring port 26 and second thrust vectoring port 42, which may be valves controlled by control unit 58 (see FIG. 1) to aid in guidance and maneuvering of an aircraft. First thrust vectoring port 26 and second thrust vectoring port 42 direct thrust from bypass flow 74 in the direction of arrows B and C, respectively, which are in a direction transverse to arrow A.

With reference to FIGS. 2 and 3, first conduit 22 is formed by wall 43, wall 30, wall 46 and wall 34. Second conduit 38 is formed by wall 30, wall 34, wall 46 and wall 48. Third conduit 50 is formed by wall 30, wall 34, wall 48 and wall 49. As shown in FIG. 2, as bypass flow 74 passes generally in the direction of arrow A, wall 46 serves to isolate pressure changes occurring in first conduit 22 due to fluid flow demand from first thrust vectoring port 26 from second conduit 38 and third conduit 50. Likewise, pressure changes in third conduit 50 causes by second thrust vectoring point 42 are isolated from second conduit 38 and first conduit 26. In this way, the fluid flow demands of first thrust vectoring point 26 have little effect on the fluid flow demands of second thrust vectoring port 42, thereby permitting sufficient pressure in first conduit 22 and third conduit 50 to allow thrust vectoring.

In addition, with reference to FIG. 3, divergent portion 18 is shaped like an ellipse having curvature $C_1$ with first elliptical radius $R_1$ and curvature $C_2$ with second elliptical radius $R_2$. $R_1$ is greater than $R_2$. First thrust vectoring port 26 and second thrust vectoring port 42 are located at portions of divergent portion 18 having curvature C1 with a higher radius, $R_1$, of first section 62, rather than section 66 having second curvature C2, with a lower radius, $R_2$. In this way, nozzle deflections caused by first thrust vectoring port 26 and second thrust vectoring port 42 are minimized because they are located on relatively rigid areas of divergent portion 18.

In addition, with reference to FIG. 2 and FIG. 3, a device for reducing pressure loss 54 is provided. The device for reducing pressure loss 54 is here a screen that extends across second conduit 38 from wall 46 to wall 48. Device for reducing pressure loss 54 impedes fluid flow from bypass flow 74 in the direction of arrow A through second conduit 38. As a consequence, high pressure is maintained in area X as shown in FIG. 2 while lower pressure is maintained in area Y. In this way, high pressure may be maintained in first conduit 22 and third conduit 50 to fee first thrust vectoring port 26 and second thrust vectoring port 42.

The foregoing description shall be interpreted as illustrative and not in any limiting sense. A worker of ordinary skill in the art would recognize that certain modifications would come within the scope of this invention. For that reason, the follow claims should be studied to determine the true scope and content of this invention.

We claim:

1. A nozzle assembly for a turbine engine, comprising:
   a convergent portion for converging fluid flow from a turbine engine core;
   a divergent portion for diverging fluid flow from the turbine engine core, said divergent portion in fluid flow communication with said convergent portion; and
   a first conduit for communication with a bypass fluid flow, said first conduit having a first thrust vectoring port and disposed proximate said divergent portion, wherein said first conduit has a first wall spaced from a second wall, said first wall defining an exterior portion of said divergent portion and said second wall defining an interior portion of said divergent portion, said interior portion for guiding fluid flow from the turbine engine core;
   a second conduit for communication with the bypass fluid flow, said second conduit having a second thrust vectoring port;
   a third wall spaced between said first conduit and said second conduit, said third wall extending transversely to one of said first wall and said second wall;
   a third conduit for communication with the bypass fluid flow, said third conduit located between said first conduit and said second conduit; and
   a device for reducing pressure loss, said device disposed across said third conduit, wherein said device for reducing pressure loss comprises a screen extending transversely to a direction of flow through said second conduit.

2. The nozzle assembly of claim 1 wherein said first and second thrust vectoring ports each comprise a valve.

3. The nozzle assembly of claim 2 including a control unit for controlling said valves.

4. The nozzle assembly of claim 1 wherein said divergent portion has a first section having a first curvature with a first radius and a second section having a second curvature with a second radius, said first radius greater than said second radius, said first thrust vectoring port located at said first section.

5. A nozzle assembly for a turbine engine, comprising:
   a convergent portion for converging fluid flow from a turbine engine core;
   a divergent portion for diverging fluid flow from the turbine engine core, said divergent portion in fluid flow communication with said convergent portion;
   a first conduit for communication with a bypass fluid flow, said first conduit having a first thrust vectoring port and disposed proximate said divergent portion;
   a second conduit for communication with the bypass fluid flow;
   a device for reducing pressure loss, said device disposed across said second conduit,
   wherein said device for reducing pressure loss comprises a screen extending transversely to a direction of flow through said second conduit;
   wherein said first conduit has a first wall spaced from a second wall, said first wall defining an exterior portion of said divergent portion and said second wall defining an interior portion of said divergent portion, said interior portion for guiding fluid flow from the turbine engine core; and
   a third wall separating said first conduit and said second conduit.

6. The nozzle assembly of claim 5 including a third conduit for communication with the bypass fluid flow, said third conduit having a second thrust vectoring port.

7. The nozzle assembly of claim 5 wherein said first thrust vectoring port comprises a valve.

8. The nozzle assembly of claim 5 wherein said divergent portion has a first section having a first curvature with a first radius and a second section having a second curvature with a second radius, said first radius greater than said second radius.

9. The nozzle assembly of claim 8 wherein said first thrust vectoring port is located at said first section.

10. The nozzle assembly of claim 8 wherein said second conduit is located at said second section.

11. A method of manufacturing a nozzle assembly for a turbine engine, the method comprising the steps of:
    providing a nozzle having a convergent portion for converging fluid flow from a turbine engine core and a divergent portion for diverging fluid flow from the turbine engine core,
    the divergent portion in fluid flow communication with the convergent portion;
    disposing a first conduit for communication with a bypass fluid flow proximate the divergent portion;
    disposing a first thrust vectoring port in the divergent portion;
    disposing a second conduit for communication with the bypass fluid flow;
    disposing a device across said second conduit, said device for reducing pressure loss,
    wherein said device comprises a screen extending transversely to a direction of flow through said second conduit;
    wherein said first conduit has a first wall spaced from a second wall, said first wall defining an exterior portion of said divergent portion and said second wall defining an interior portion of said divergent portion, said interior portion for guiding fluid flow from the turbine engine core; and
    disposing a third wall separating said first conduit and said second conduit.

12. The method of claim 11 further including disposing a third conduit for communication with the bypass fluid flow, said third conduit having a second thrust vectoring port.

13. The method of claim 12 including establishing a fluid flow through the first and second thrust vectoring ports, the thrust vectoring ports directing the fluid flowing therethrough in a direction transverse to an axis of the nozzle.

* * * * *